Figure 1:
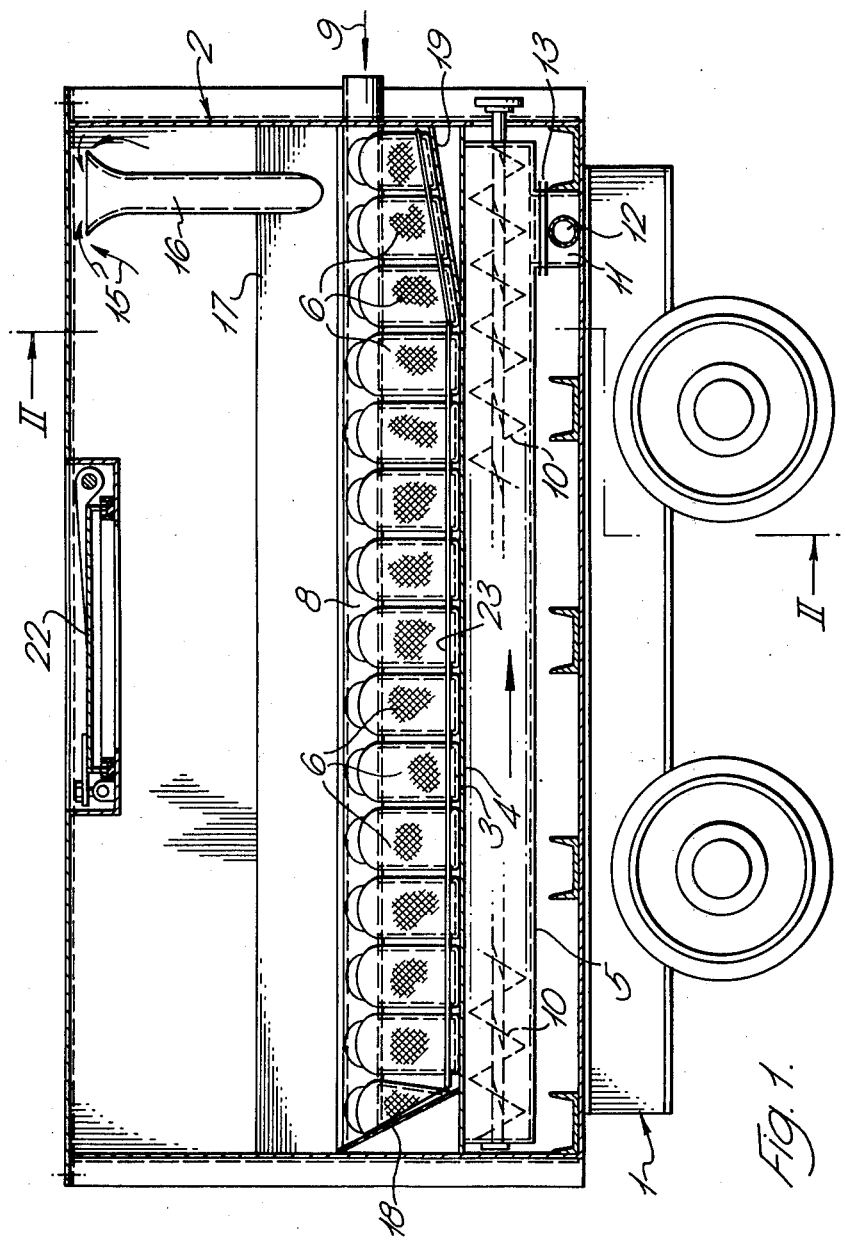

United States Patent [19]

Hiorns

[11] 4,289,428

[45] Sep. 15, 1981

[54] PARTICULATE MATTER AIR ASSISTED SCREW DISCHARGE APPARATUS

[75] Inventor: Frederick J. Hiorns, Orpington, England

[73] Assignee: The Associated Portland Cement Manufacturers Limited, London, England

[21] Appl. No.: 821,147

[22] Filed: Aug. 2, 1977

[30] Foreign Application Priority Data

Aug. 6, 1976 [GB] United Kingdom ............. 32849/76

[51] Int. Cl.³ .......................................... B65G 53/38
[52] U.S. Cl. .................... 406/39; 222/195; 406/61; 406/146
[58] Field of Search ............... 302/50, 53; 222/193, 222/195, 1, 263, 608, 626, 412, 413, 630, 637; 406/39, 53, 55, 61, 90, 93, 146

[56] References Cited

U.S. PATENT DOCUMENTS

| | | | |
|---|---|---|---|
| 1,991,403 | 2/1935 | McManamna | 406/146 X |
| 2,132,980 | 10/1938 | Woolley et al. | 406/61 X |
| 3,121,593 | 2/1964 | McIlvaine | 222/193 X |
| 3,201,000 | 8/1965 | Hermanns | 222/195 X |
| 3,246,805 | 4/1966 | Kemp | 222/195 |

FOREIGN PATENT DOCUMENTS 1434276 2/1966 France .............................. 222/195

Primary Examiner—David A. Scherbel
Assistant Examiner—Fred A. Silverberg
Attorney, Agent, or Firm—Diller, Ramik & Wight

[57] ABSTRACT

A mobile bulk container for particulate solid matter having at least one gas permeable internal floor element for the transmission of air therethrough within a container to fluidize particulate matter resting on the floor, the latter element sloping downwardly toward one side of the container, a bottom discharge pipe for discharging particulate matter from the container, conduits for supplying air upwardly through the floor element, an air conduit leading from adjacent the top of the space within the container to the discharge pipe for transmission of the air from the container to the pipe, and a screw conveyor mounted within and along the bottom of the container at the side thereof below the lower end of the floor element ending at the discharge pipe for conveying the particulate matter out of the container while effectively providing therewith an air seal between the container and the discharge pipe.

11 Claims, 2 Drawing Figures

PARTICULATE MATTER AIR ASSISTED SCREW DISCHARGE APPARATUS

The present invention relates to the discharge of fine particulate matter such as cement which is liable to form airborne dust, from a transportable container such as a cement railcar.

In discharging cement from a bulk container on a railcar, truck or lorry adapted to carry such matter and discharge it through an outlet pipe it is common practice to employ air to fluidize the cement in the container to assist discharge. For instance by means of a pump which may be mounted on the vehicle, primary air is supplied through a porous pad into the bottom of the container, to fluidize the contents of the container and cause them to flow out of the discharge pipe, while secondary air branched off from the primary air supply is fed through another porous pad in the bottom of the discharge pipe to keep the contents of the pipe fluidized.

The cement is normally discharged to a silo for storage at the site where it is to be used eventually. One aim of such an arrangement is to unload the container as quickly as possible.

On the other hand, in underground locations or confined spaces generally, where storage as in a silo is not practicable, where cement is being used and is supplied for example by means of railcar bulk containers, it is desired to provide for a relatively slow but constant discharge with the minimum of raised dust.

It is an object of the present invention to provide means for discharging a bulk container of fine particulate matter such as cement, suitable for use underground or in a confined space, employing a minimum amount of air.

According to the invention a method of discharging fluidizable particulate matter from a container therefor, through a discharge conduit, comprises feeding a supply of air to the interior of the container in such a manner as to fluidize particulate matter in the container, allowing said supply of air to leave the container as an overhead effluent and using air from this effluent in the discharge conduit to assist the discharge through said conduit of particulate matter conveyed from the container. Preferably positive conveying means is provided to move particulate matter from the bottom of the container to the discharge conduit.

Apparatus for performing the invention suitably comprises a mobile container such as a bulk cement railcar, fitted with at least one gas-permeable internal floor element for the transmission of air therethrough to fluidize particulate matter resting on the floor, a bottom discharge pipe for such particulate matter from the container, means for supplying air upwardly through said floor element, and an air conduit leading from adjacent the top of the space within the container to said discharge pipe for transmission of air from the container into the pipe. Preferably a plurality of parallel gas-permeable floor elements slope down towards one side of the container.

Preferably a conveyer such as a screw conveyor is mounted within and along the bottom of the container, for instance in a channel or gully along the side of the container below the lower end of the sloping gas-permeable floor element or elements, ending at or in the discharge pipe, for conveying the particulate matter out of the container.

The air supplied to the container for fluidizing is thus used twice, first to fluidize the cement on the floor in the container to cause it to slide or flow down to the conveyor, and secondly by way of the air discharge pipe from the top of the container to the solids discharge pipe, to move the discharge cement through the pipe to its outlet. The secondary air may be directed for instance axially straight into the discharge pipe, thus carrying the discharged particulate material with it, or upwardly through a gas-permeable portion of the underside of the discharge pipe to fluidize the particulate matter expelled through the pipe by the conveyer. Although the pressure of the secondary air is relatively low it can be enough to keep cement flowing in the pipe. The total air used is kept to the minimum necessary to operate the discharge and is less than in prior methods and constructions. The dust problem is lessened and more readily controlled.

The discharge rate can be controlled by regulating the conveyor, because the cement powder settles onto the conveyor out of the fluidized state and provides an air seal between the container and the discharge pipe.

Figure 2:
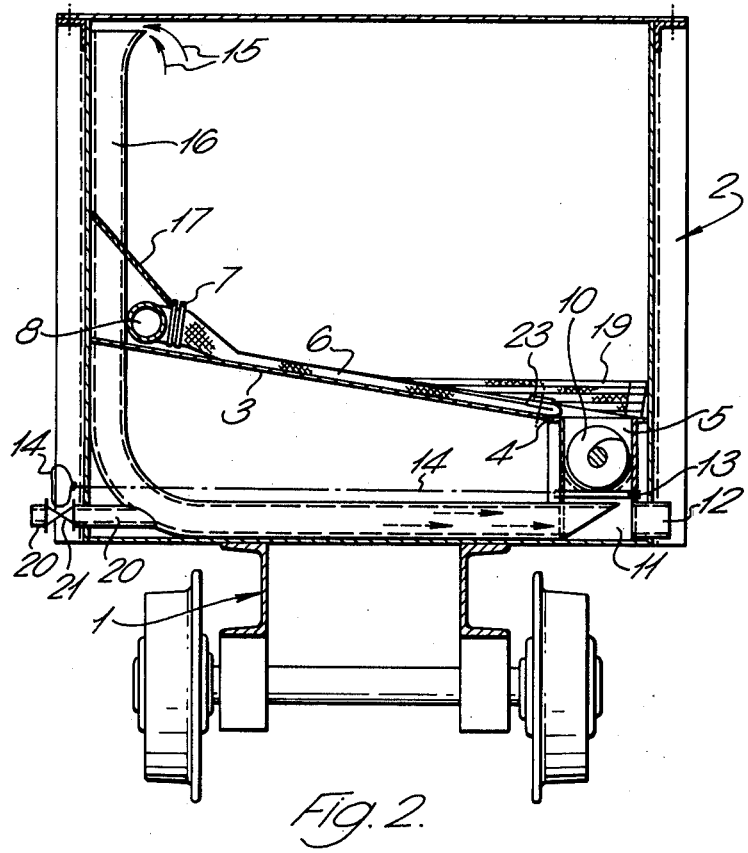

The invention is illustrated in the accompanying drawings, in which:

FIG. 1 is a cross-sectional side elevation of a bulk cement railcar embodying a container according to the invention; and FIG. 2 is a cross-sectional end elevation of the railcar of FIG. 1 on the line II—II in FIG. 1.

In FIGS. 1 and 2 there is shown mounted on a railcar base 1 a bulk container 2 for cement. The railcar is intended for the delivery of cement underground to the area of an advancing coal face. Along the length of the lower part of the container 2 there is a floor 3 which slopes downwardly from one side of the container to the inner top edge 4 of a channel 5 along the other side and near the bottom of the container.

The floor 3 supports a series of parallel, transverse, laterally sloping floor elements 6 each formed of a length of gas-permeable aerating hose detachably secured by clips 7 to an air manifold 8 fed from an air supply at 9, and closed at their lower ends under a clamp bar 23. This air serves to fluidize powdered cement resting on the floor 3 and floor elements 6; the object of such fluidization is to encourage flow of the matter down the shallow slope of the floor; the purpose of the shallow slope, as opposed to a steep slope such as would be needed for gravity discharge, is to provide increased capacity in a restricted volume. The powdered cement which slides off the floor elements 6 descends to the side of the container and into the channel 5 in which a screw conveyer 10 is mounted to rotate so as to convey the fallen powdered cement into the space 11 for discharge through pipe 12. The powdered cement temporarily present in the channel 5 is in general not fluidized and thus serves to provide a seal between the air in the container and the air in the discharge pipe. Further positive sealing is provided when required by slide valve 13 operable by rod 14 from outside the railcar.

Air which has served to fluidize the cement on the floor of the container is allowed to leave the container as shown by arrows 15 near the top of the container by way of a pipe 16 and is delivered by pipe 16 to a point in space 11 under the conveyor 10 opposite the discharge pipe 12, where pipe 16 is shaped and directed to assist cement discharge through pipe 12.

In practice the air supply is controlled so as to exert the minimum pressure needed to obtain discharge of the cement powder through discharge pipe 12, so that production of airborne dust at the outlet is minimised or even eliminated.

Air-return pipe 16 has a flared inlet to reduce air velocity and a deflector plate 17 is provided above the air manifold 8 to deflect cement onto the aerated floor area. The ends of the floor 3 are likewise angled as at 18, 19, to provide downward slopes from the ends of the container.

An auxiliary air supply pipe 20 fitted with a valve 21 permits adjustment of the air stream in pipe 16 without having to alter the fluidizing effect on the floor. A flush fitting inspection cover 22 is fitted in the roof. All joints are made air-tight.

The air supply to the railcar may be derived from the coal mine pit compressed air supply, or an electrically or hydraulically driven compressor mounted locally or on the car itself. Electric or hydraulic motive power will normally be available to drive the conveyor. The railcar may be typically associated with a grout pump or slurry line to which it discharges, so that the water employed effectively cleans the air used before its discharge to the atmosphere.

It will be appreciated that although the invention has been described largely in terms of cement powder as the particulate solid matter in question, the invention can be readily applied to the discharge from bulk containers, whether mobile or not, of any fluidizable particulate solid matter.

What is claimed is:

1. A mobile bulk container from which particulate solid matter is adapted to be discharged in a relatively constant manner with a minimum of raised dust comprising a closed container defining a fluidizing chamber within which the particulate matter is admixed with air, said container having a downwardly sloping floor upon which the particulate matter may rest, said sloping floor having a bottom edge terminating adjacent and along a channel, means for directing pressurized air upwardly from said floor to admix with and fluidize at least a portion of the particulate matter, a screw conveyor within said channel into which the particulate matter is collected and conveyed by said screw conveyor toward a discharge end area of said channel within said container, said screw conveyor and said channel being constructed and arranged to provide in conjunction with the collected particulate matter an air seal between the fluidized portion of the particulate matter in said fluidizing chamber and the particulate matter discharged by said screw conveyor at said discharge end area, conduit means leading from adjacent a top of said fluidizing chamber and opening into said discharge end area within said container for refluidizing the discharged solid matter at said discharge end area, a discharge opening placing said discharge area into fluid communication with atmosphere through which the refluidized particulate matter is discharged to atmosphere in the relative absence of raised dust due to the air seal between said fluidizing chamber and said discharge area, a discharge port between said discharge area and said conduit means through which the particulate material discharged by said screw conveyor enters said discharge area, and means for varying the size of said discharge port to controllably regulate the flow of the discharged material into the discharge area and hence to atmosphere.

2. The container as defined in claim 1 including means for supplying auxiliary air under pressure into said conduit means.

3. A mobile bulk container from which particulate solid matter is adapted to be discharged in a relatively constant manner with a minimum of raised dust comprising a closed container defining a fluidizing chamber within which the particulate matter is admixed with air, said container having a downwardly sloping floor upon which the particulate matter may rest, said sloping floor having a bottom edge terminating adjacent and along a channel, means for directing pressurized air upwardly from said floor to admix with and fluidize at least a portion of the particulate matter, a screw conveyor within said channel into which the particulate matter is collected and conveyed by said screw conveyor toward a discharge end area of said channel within said container, said screw conveyor and said channel being constructed and arranged to provide in conjunction with the collected particulate matter an air seal between the fluidized portion of the particulate matter in said fluidizing chamber and the particulate matter discharged by said screw conveyor at said discharge end area, conduit means leading from adjacent a top of said fluidizing chamber and opening into said discharge end area within said container for refluidizing the discharged solid matter at said discharge end area, a discharge opening placing said discharge area into fluid communication with atmosphere through which the refluidized particulate matter is discharged to atmosphere in the relative absence of raised dust due to the air seal between said fluidizing chamber and said discharge area, and means for supplying auxiliary air under pressure into said conduit means.

4. A bulk container from which particulate solid matter is adapted to be discharged in a relatively constant manner with a minimum of airborne dust comprising a closed container defining a fluidizing chamber adapted to receive a bed of solid particulate matter, perforate means for discharging fluidizing air upwardly within said fluidizing chamber, means for continuously supplying pressurized air to said perforate means at a rate sufficient to maintain the bed of particulate matter in a flowable fluidized condition, said container including a collecting channel disposed in a bottom thereof into which the material of said fluidized bed may settle, a discharge area downstream of said collecting channel, mechanical conveying means for causing said settled particulate matter to form an air seal within said collecting channel between said fluidizing chamber and said discharge area, an outlet port leading from said discharge area to atmosphere, conduit means connected between an upper portion of said fluidizing chamber and said discharge area for directing air into said discharge area and toward said outlet port to expel the solid particulate matter to atmosphere without substantially forming airborne dust, a discharge port between said discharge area and said channel through which particulate matter discharged by said mechanical conveying means enters said discharge area, and means for varying the size of said discharge port to controllably regulate the flow of the discharged matter into the discharge area and, hence to atmosphere.

5. The bulk container as defined in claim 4 including means for supplying auxiliary air under pressure into said conduit means.

6. A bulk container from which particulate solid matter is adapted to be discharged in a relatively constant manner with a minimum of airborne dust comprising a closed container defining a fluidizing chamber adapted to receive a bed of solid particulate matter, perforate means for discharging fluidizing air upwardly within said fluidizing chamber, means for continuously supplying pressurized air to said perforate means at a rate sufficient to maintain the bed of particulate matter in a flowable fluidized condition, said container including a collecting channel disposed in a bottom thereof into which the material of said fluidized bed may settle, a discharge area downstream of said collecting channel, mechanical conveying means for causing said settled particulate matter to form an air seal within said collecting channel between said fluidizing chamber and said discharge area, an outlet port leading from said discharge area to atmosphere, conduit means connected between an upper portion of said fluidizing chamber and said discharge area for directing air into said discharge area and toward said outlet port to expel the solid particulate matter to atmosphere without substantially forming airborne dust, and means for supplying auxiliary air under pressure into said conduit means.

7. A bulk container from which particulate solid matter is adapted to be discharged in a relatively constant manner with a minimum of airborne dust comprising a closed container defining a fluidizing chamber adapted to receive a bed of solid particulate matter, perforate means for discharging fluidizing air upwardly within said fluidizing chamber, means for continuously supplying pressurized air to said perforate means at a rate sufficient to maintain the bed of particulate matter in a flowable fluidized condition, said container including a collecting channel disposed in a bottom thereof into which the matter of said fluidized bed may settle, a discharge area wholly beneath said collecting channel, mechanical conveying means for causing said settled particulate matter to form an air seal within said collecting channel between said fluidizing chamber and said discharge area, an outlet port leading from said discharge area to atmosphere, a discharge port between said discharge area and said channel through which particulate matter discharged by said mechanical conveying means enters said discharge area, means for varying the size of said discharge port to controllably regulate the flow of the discharged matter into the discharge area and, hence, to atmosphere, and conduit means connected between an upper portion of said fluidizing chamber and said discharge area for directing air into and through said discharge area wholly beneath said channel and toward said outlet port to expel the solid particulate matter to atmosphere without substantially forming airborne dust.

8. The bulk container as defined in claim 7 including means for supplying auxiliary air under pressure into said conduit means.

9. The bulk container as defined in claim 7 wherein said perforate means include a plurality of parallel gas permeable floor elements within said fluidizing chamber sloping downwardly toward said channel.

10. The bulk container as defined in claim 9 including means for supplying auxiliary air under pressure into said conduit means.

11. The bulk container as defined in claim 10 wherein said gas permeable floor elements are lengths of permeable hose closed at lower ends thereof and detachably secured to an air supply manifold pipe at upper ends thereof.

* * * * *